(Model.)
F. ECKSTEIN, Jr.
DRIVE CHAIN.
No. 423,038. Patented Mar. 11, 1890.
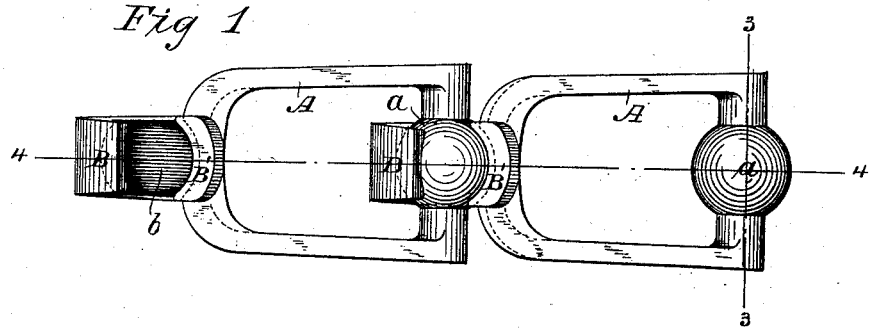
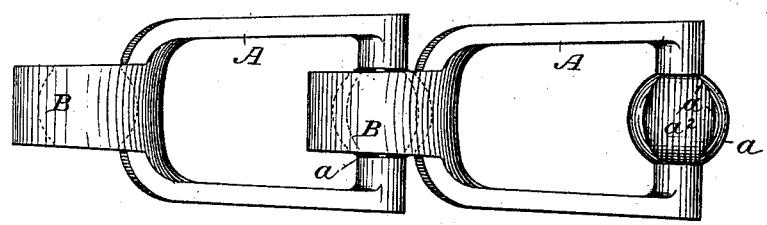
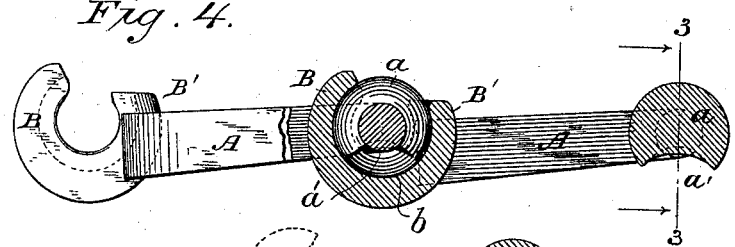
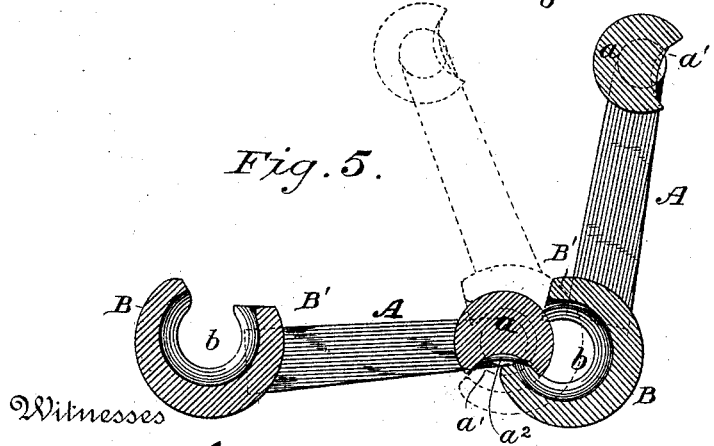
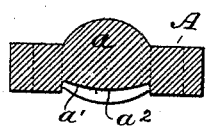
Witnesses
Wm. A. Skinkle
C. A. Skinkle
Inventor
Fred Eckstein Jr.
By his Attorneys
Parkinson & Parkinson

UNITED STATES PATENT OFFICE.

FRED ECKSTEIN, JR., OF CINCINNATI, OHIO.

DRIVE-CHAIN.

SPECIFICATION forming part of Letters Patent No. 423,038, dated March 11, 1890.

Application filed April 5, 1889. Renewed February 12, 1890. Serial No. 340,096. (Model.)

*To all whom it may concern:*

Be it known that I, FRED ECKSTEIN, Jr., a citizen of the United States, residing at Cincinnati, in the county of Hamilton and State of Ohio, have invented certain new and useful Improvements in Drive-Chains, of which the following is a specification.

In an application filed by me on the 12th day of July, 1886, Serial No. 207,772, I have described and claimed an improvement in drive-chains, wherein a detachable sprocket-link has at one end a ball or knob, in the back of which is a notch or recess, and at the opposite end has an internally-channeled or concave hook adapted to receive the ball or knob of an adjacent link of like construction, and a lug or projection from the body part opposite the point of the hook and partly closing the throat thereof to engage with the notch in said latter ball.

My present invention is an improvement upon the above construction, differing therefrom in the following respects: that instead of the notch or groove being upon the back of the knob or ball—that is, upon the exposed surface as the chain travels around the wheel—it is upon the face or inner or wheel side, and instead of engaging with a projection rising from the body part opposite the point of the hook it engages with the point of the hook itself, thereby enabling me to carry the internal concave or channel clear around the socket from the point of the hook to that point on the body or upon a projection arising therefrom opposite to the point of the hook which is coincident with the upper surface thereof, and insuring that when once connected and thrown over wheels an unbroken spherical surface will be opposed to escape from the throat of the hook, so that there will be no danger of catching and no danger of getting clogged.

In the drawings, Figure 1 is a top plan view of two links constructed according to my present invention coupled together. Fig. 2 is a like plan view, but taken from the opposite side, or the side which comes in contact with the periphery of the sprocket-wheel; Fig. 3, an enlarged sectional detail taken on the correspondingly-numbered line in the first and fourth figures. Fig. 4 is a longitudinal section from the correspondingly-numbered line in the first figure, and Fig. 5 is a diagrammatic elevation in section to illustrate the method of coupling two links together.

A represents a link, having for the purposes of this description a central aperture for the reception of the sprocket, and herein shown as constructed with side and end bars, which make that aperture substantially rectangular in form. One end of each link is formed by a bar having centrally thereof a spheroidal or nearly spheroidal ball or enlargement $a$ on that side of the bar which may be termed the "inner" or "wheel" side—that is, the one that comes in contact with the sprocket-wheel and is always on the inside of the chain when it is mounted. A groove $a'$, which in practice will be somewhat rounded, is formed longitudinally of the bar, and this, owing to the outline of the hook, may be somewhat raised in the middle, as at $a^2$, so as to preserve as much strength of the metal as possible, as directly explained. The hook B, into which the side bars of the link merge at the end opposite to the ball or knob, has a rounded or concave channel or socket $b$ upon its internal face, commencing at the point of the link and running round until it terminates at the outer surface of the adjacent end bar, or is advisably carried somewhat thereabove by a short counter-hook or ledge B', the groove being continued clear to the extremity of this counter-hook as well as clear to the extremity of the main hook. Thus the throat of the hook presents on each side a concave entrance of substantially the same width as the width of the channel in any part of the hook.

In coupling the links together they are placed in substantially the position indicated in full lines in Fig. 5, the point of the hook entering the groove through the inner side of the ball and its thickened sides, passing along the sunken parts of the groove, while the central cross-rib of said groove, if any, will be received within the mouth of the socket in the hook. From this position the links will be turned down toward each other into the position represented by the link in dotted lines. Then they will be swung around until aligned with each other, as represented in the first, second, and fourth figures, when the union will be complete, and thereafter they can only be uncoupled by reversing the motions employed in coupling them. It will be observed that by this construction the spherical surface of the ball only is exposed when the links are coupled, and that this practically fills the entire throat of the socket, prohibiting any escape or uncoupling of the parts in any position whatever that can possibly be assumed in practical employment.

A further advantage of having the ball-surface uppermost when in action is that there is no liability of catching upon the point of the hook or upon the adjacent end bar of the link or any lug or projection therefrom, and a still further advantage is that should any clogging matter or hard substance fall upon the peripheral face of the ball it will be shed, whereas were the groove in the ball exposed it might be caught therein and carried around under the hook and wedged thereagainst, so as to break it in the stress and flexions of the chain.

I claim—

1. As an improvement in drive-chains, a detachable sprocket-link having at one end a hook formed with a rounded channel or socket upon its inner face and at the other end a spheroidal knob or ball grooved transversely of the link upon its inner or wheel side to engage with the point of the hook of an adjacent link of like construction for the purpose of coupling two links together.

2. As an improvement in drive-chains, a detachable sprocket-link having at one end a hook formed with a rounded socket or channel on its inner face and at the other end a ball or spheroid grooved transversely of the hook upon its inner or wheel face to engage with the hook of an adjacent link of like construction, and having a rib or enlargement crosswise of said hook to enter the mouth of the socket in said hook when being thus engaged.

3. As an improvement in drive-chains, a detachable sprocket-link having at one end a hook formed with a rounded channel or socket on its inner face, and upon the adjacent body part a ledge or counter-hook to the top of which said channel is continued, and having upon the opposite body part a spheroidal knob or ball grooved on its inner or wheel side transversely of the link to engage with the point of the main hook of a link of like construction in the coupling operation.

FRED ECKSTEIN, JR.

Witnesses:
ELLIOTT H. PENDLETON, Jr.,
HENRY OTTERMANN.